(No Model.)
E. J. LUCAS.
PUNCH FOR CUTTING OUT GLOVE FOURCHETTES.
No. 577,766. Patented Feb. 23, 1897.
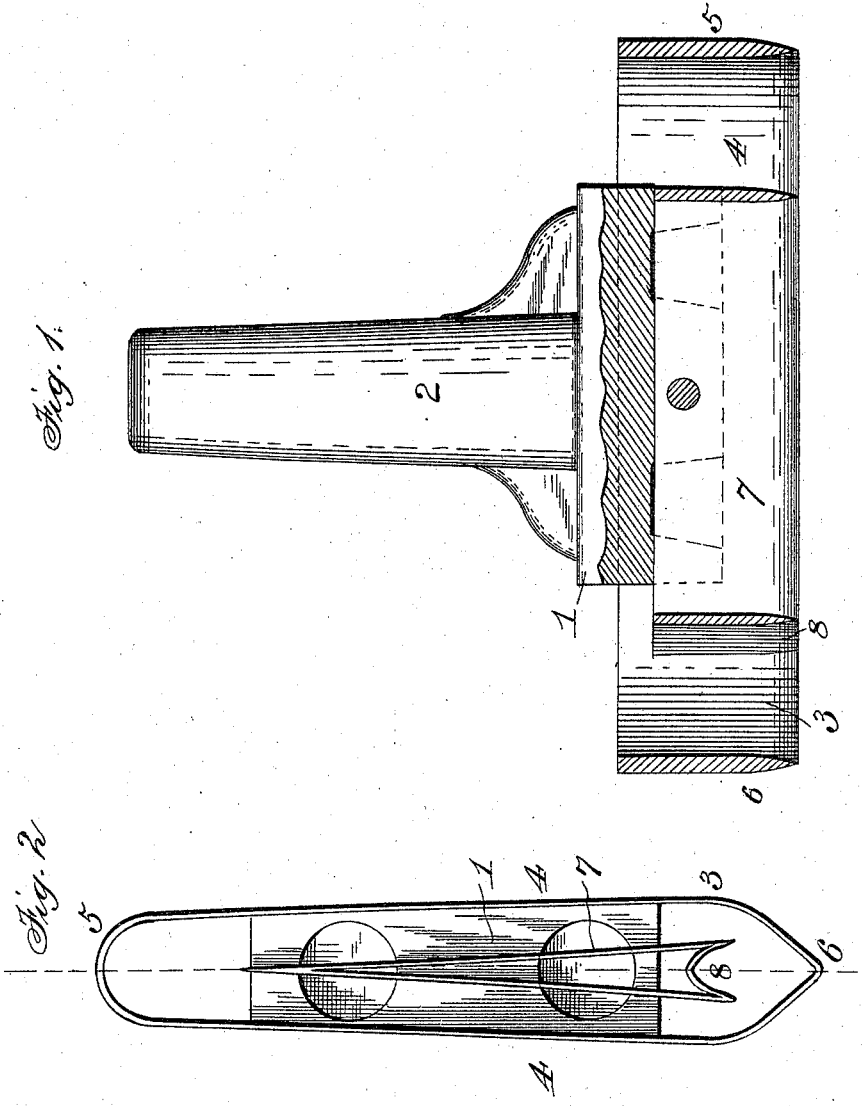
Witnesses.
F. L. Durand
Jno. L. Coombs
Inventor.
Edward J. Lucas,
Louis Bagger & Co.
Attorneys

UNITED STATES PATENT OFFICE.

EDWARD J. LUCAS, OF JOHNSTOWN, NEW YORK.

PUNCH FOR CUTTING OUT GLOVE-FOURCHETTES.

SPECIFICATION forming part of Letters Patent No. 577,766, dated February 23, 1897.

Application filed May 26, 1896. Serial No. 593,166. (No model.)

*To all whom it may concern:*

Be it known that I, EDWARD J. LUCAS, a citizen of the United States, and a resident of Johnstown, in the county of Fulton and State of New York, have invented certain new and useful Improvements in Tools or Punches for Cutting Out Gloves; and I do hereby declare that the following is a full, clear, and exact description of the invention, which will enable others skilled in the art to which it appertains to make and use the same, reference being had to the accompanying drawings, which form a part of this specification.

My invention relates to tools or punches used in the manufacture of gloves; and its object is to provide an improved construction of the same which shall possess superior advantages with respect to economy and efficiency in use.

In the ordinary manner of making gloves it is the custom to punch or cut out the fourchette and quirk separately, which are subsequently sewed to each other, thus requiring two different tools and two different operations.

By my invention the fourchette and quirk are cut out by a single tool at one and the same time, thus effecting a considerable saving in time and labor, and consequently enabling the glove to be produced at a reduced cost.

The invention consists in the novel construction and combination of parts hereinafter fully described and claimed.

In the accompanying drawings, Figure 1 is a central longitudinal view of a glove-punch constructed in accordance with my invention. Fig. 2 is a bottom view of the same.

In the said drawings the reference-numeral 1 designates a metal block or head, preferably of cast-iron, and provided with a handle 2. The two opposite sides of this block taper or converge toward one end and have secured to it an endless cutting-blade 3, comprising the sides 4, the curved end 5, and the curved and pointed opposite end 6. Secured to said block at the center thereof is a triangular-shaped blade 7, the sides of which converge or come together at one end and the base or opposite ends of which are connected by a curved or approximately semicircular blade 8.

The punch is used in the ordinary manner, but by means of the triangular blade and curved end the quirk is formed integral with the fourchette, thus saving the expense of two different tools and the time lost in cutting the fourchette and quirk separately.

Having thus fully described my invention, what I claim is—

As an improved article, a punch for cutting out fourchettes and quirks for glove-fingers, comprising the outer endless blade consisting of the converging side portions and the curved and rounded end portions, and the inner triangular blade connected together at the divergent ends by an inwardly-extending curved portion, substantially as described, whereby a fourchette may be cut having the quirk integral therewith.

In testimony that I claim the foregoing as my own I have hereunto affixed my signature in presence of two witnesses.

EDWARD J. LUCAS.

Witnesses:
JOHN M. RUSSELL,
HARWOOD DUDLEY.